Jan. 10, 1961 G. L. CLAPPER 2,968,002

PUSH-PULL RING CIRCUIT

Filed Aug. 31, 1956 4 Sheets-Sheet 1

INVENTOR.
GENUNG L. CLAPPER

BY William N. Barret Jr.

ATTORNEY

Jan. 10, 1961 G. L. CLAPPER 2,968,002

PUSH-PULL RING CIRCUIT

Filed Aug. 31, 1956 4 Sheets-Sheet 3

2,968,002

PUSH-PULL RING CIRCUIT

Genung L. Clapper, Vestal, N.Y., assignor to International Business Machines Corporation, New York, N.Y., a corporation of New York Filed Aug. 31, 1956, Ser. No. 607,475

3 Claims. (Cl. 328—43)

The present invention relates to an improved ring circuit.

More particularly, the present invention relates to a ring circuit of a type such as shown in the patent to E. S. Hughes, No. 2,628,309.

In the ring circuit as shown by the Hughes patent there are a number of bistable devices; each bistable device forming a stage in the ring circuit. These devices are so connected that an advance pulse generated by one device going from an On to an Off condition operates the next succeeding device from an Off condition to an On condition. Each stage of the ring has an output to which a load may be connected.

A ring drive, i.e., source of timing pulses, furnishes pulses, each pulse operating to bias all devices in the ring to an Off condition. The advance pulse from the device going from an On to an Off condition is longer in duration than the ring drive pulse so that the next succeeding device to which said advance pulse is supplied is operated to an On condition.

One difficulty associated with a ring circuit of the above type is the necessity for precisely timed ring drive pulses. This is because each ring drive pulse biases each device to an Off condition. To operate a device to an On condition, it is necessary that the advance pulse from the preceding stage be longer than the ring drive pulse so that it will be effective after the drive pulse has terminated. Therefore, if the ring drive pulse is longer than the advance pulse, all devices will be set to an Off condition and the ring will fail.

An inconvenience which is present in ring circuits of the above type is the necessity for designing a ring drive pulse source in accordance with the number of stages in the ring. Since the action of the ring drive pulse source is to bias each individual stage to an Off condition for each individual pulse, it is evident that the power required for the timing source will be dependent upon the number of stages.

It is therefore an object of the present invention to provide an improved ring circuit.

It is a further object of this invention to provide a ring circuit wherein a ring drive pulse source is selectively coupled to the individual stages of the ring.

It is another object of this invention to provide a ring circuit which is not critical as to the width of the ring drive pulses.

It is a further object of this invention to provide a ring circuit wherein the ring drive pulses accurately determine the On-Off time of the individual stages so that the output pulses from the individual stages will not be generated during the same period of time.

It is another and further object of this invention to provide a ring circuit wherein the ring drive pulse source may be coupled to the output of the individual stages.

Other objects of the invention will be pointed out in the following description and claims and illustrated in the accompanying drawings, which disclose, by way of examples, the principle of the invention and the best mode, which has been contemplated, of applying that principle.

In the drawings:

Figure 1 illustrates three stages of a ring circuit utilizing the present invention.

Figures 2*a* and 2*b* show the detailed circuit of the ring circuit shown in Figure 1.

Figure 1:
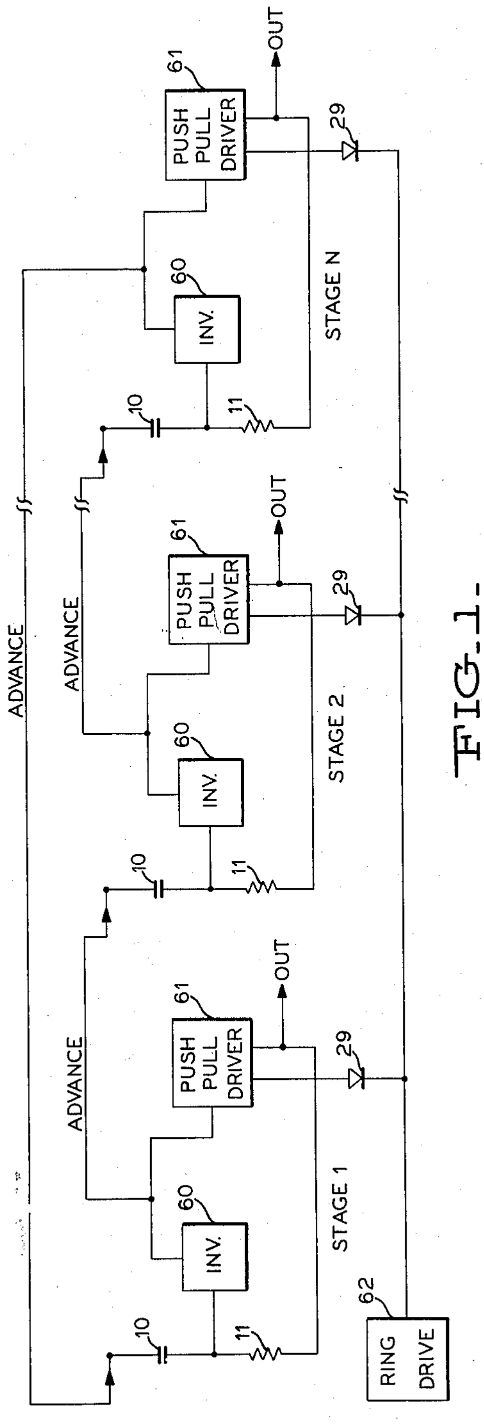

Figure 1 shows three stages of a closed ring circuit which may consist of any number desired. Each stage consists of an inverter 60 and a push-pull driver 61 connected together so that the output of inverter 60 determines the condition of push-pull driver 61 and driver 61 determines the condition of inverter 60. The elements are therefore mutually dependent on one another and will be set in a first or second stable state dependent upon the output of 60 or 61.

Each stage in the ring circuit is connected to the next succeeding stage over the advance pulse line. When stage 1 goes from an On to an Off condition, a pulse is generated by inverter 60 which, when coupled to the next succeeding stage, turns the stage On. Each stage is connected to a ring drive which functions to turn the stage which is On to an Off position. The frequency of the ring drive 62 will therefore determine the speed at which the ring will operate.

Figure 2A:
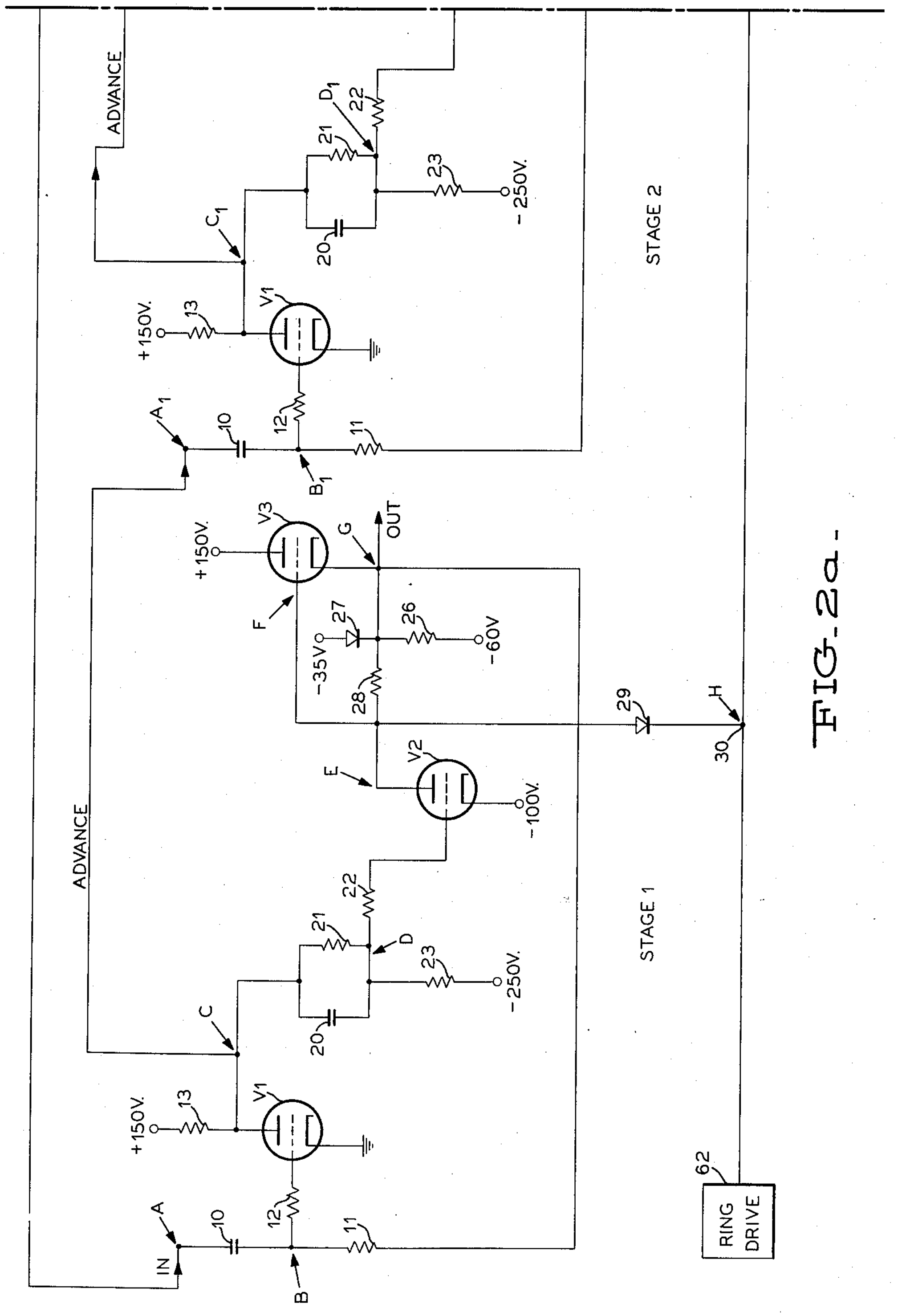
Figure 2B:
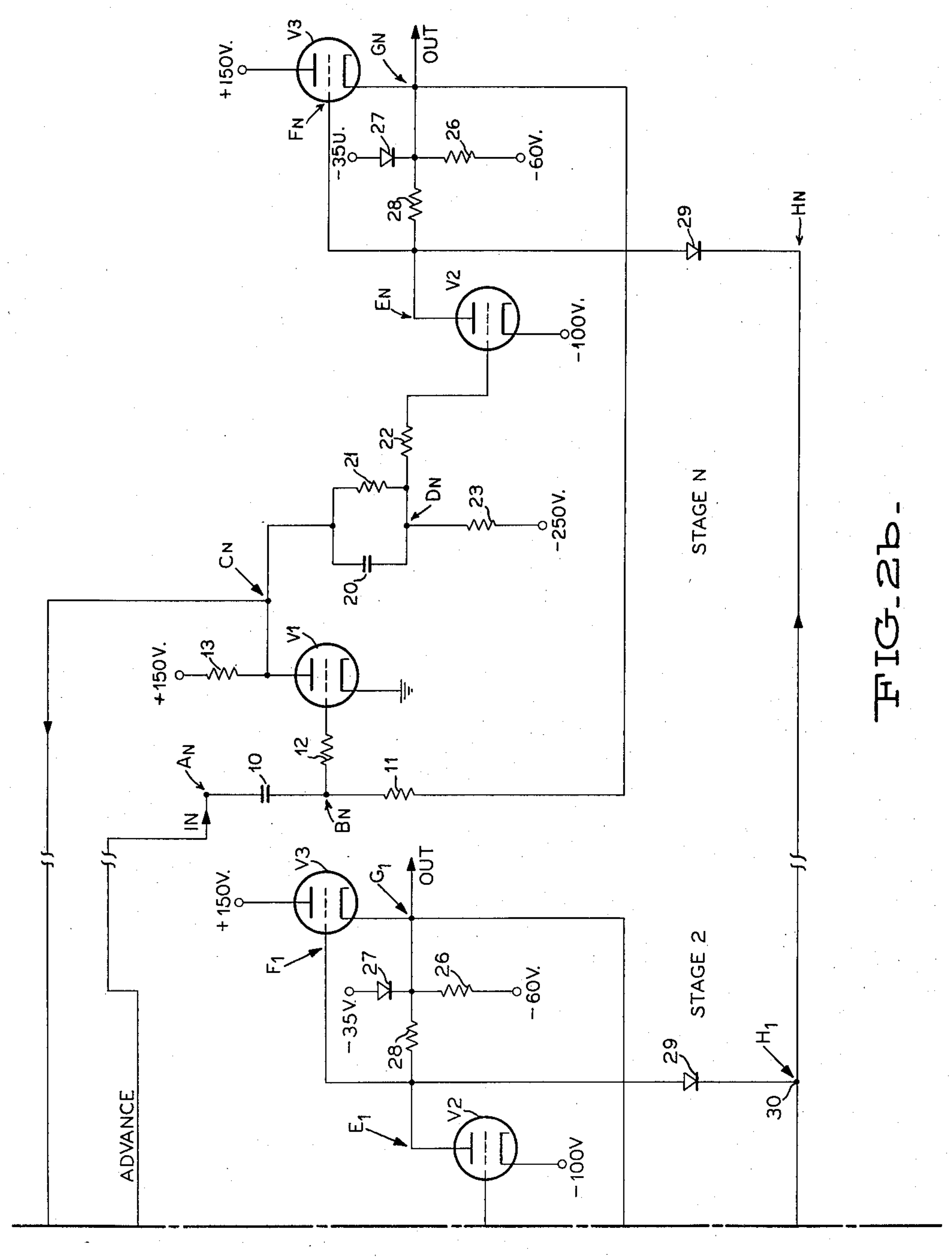
Figure 3:
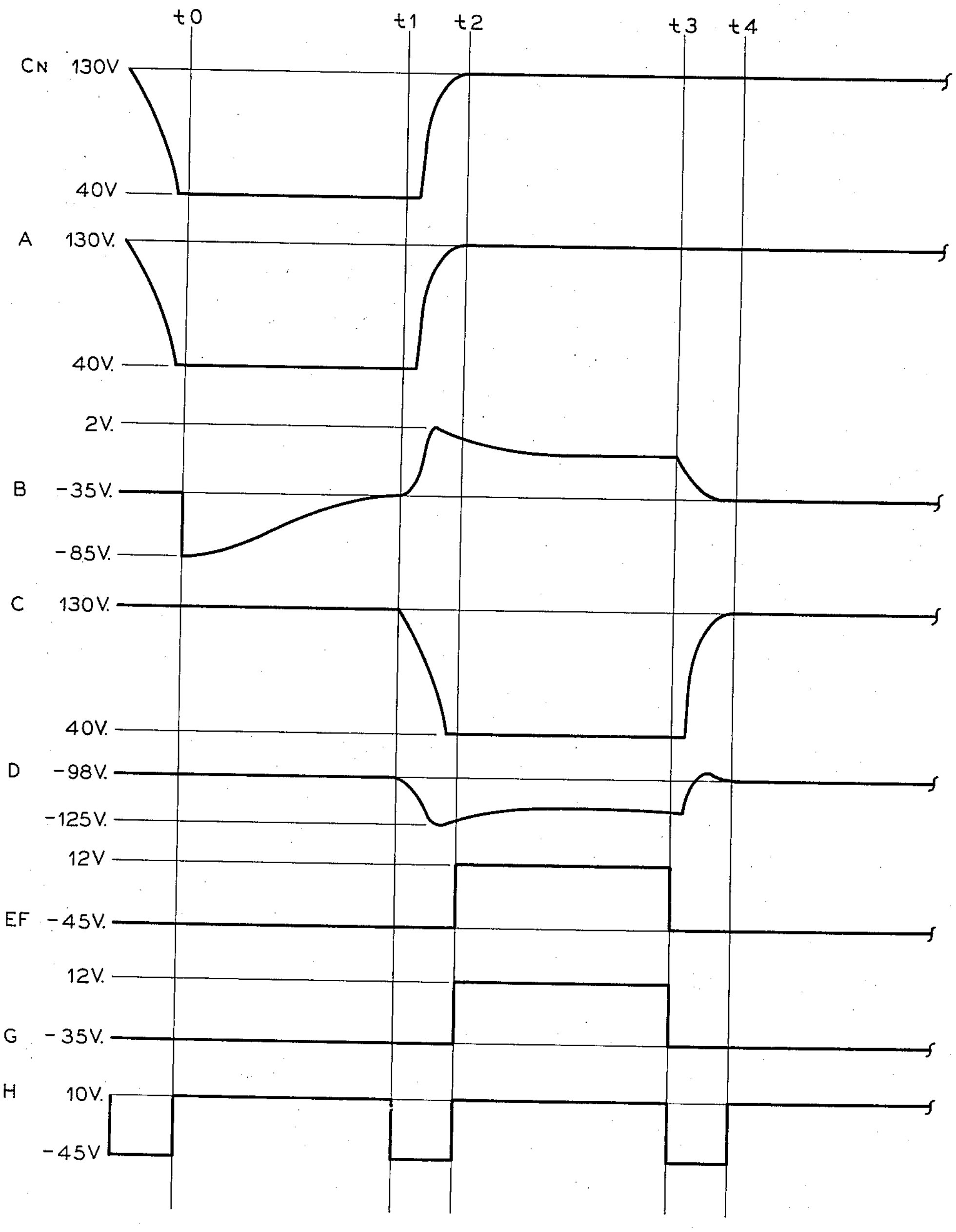
Figure 3 shows the waveforms associated with various points in the circuit of Figures 1, 2*a* and 2*b*.

Referring now to Figures 2*a* and 2*b* which show the detailed circuit of Figure 1, and assuming that stage N is On while stages 1 and 2 are Off, $t_0$ of Figure3, tube $V_1$ of stage N will be conducting and the voltage at the plate of tube $V_1$, $C_N$ of Figure 3, will be at a low value. The plate of tube $V_1$, stage N, is connected to the grid of tube $V_1$, stage 1, through a capacitor 10. Since stage 1 was in an Off position when stage N was turned On, tube $V_1$ was nonconducting and a voltage of −35 v. was being applied through diode 27 to the grid of said tube $V_1$ to keep it nonconducting as illustrated by voltage B, Figure 3. At the instant the voltage on the advance pulse line from stage N to stage 1 dropped to a low value, $t_0$, the voltage at the grid of tube $V_1$ of stage 1 dropped to −85 v. because of the differentiating action of condenser 10 and resistor 11. Throughout the period $t_0$ to $t_1$, the voltage B will rise until it assumes a potential equal to that normally applied through the resistor 11. During this period, stage N is On.

At a time $t_1$, Figure 3, a timing pulse H appears on the ring drive line and turns stage N Off. As the voltage $C_N$, Figure 3, begins to rise, the voltage B at the grid of tube $V_1$, stage 1, rises to a positive value (2 v.). Tube $V_1$ begins to conduct as shown by voltage C, Figure 3, $t_1$ to $t_2$ and the plate voltage drops toward 40 v. As the plate voltage C drops toward its lower value, the voltage D at the grid of tube $V_2$ begins to drop from −98 v. toward −125 v. At this point it will be well to remember that stage 1 is Off at time $t_1$ and should not switch On until time $t_2$ while stage N was turned Off at $t_1$. This is the result of the timing pulse which begins at $t_1$ and terminates at $t_2$.

When the voltage at the grid of tube $V_2$ drops much below −100 v., as shown by D, Figure 3, tube $V_2$ cuts off. This, in the usual course of events, would cause the plate voltage of $V_2$ to rise; but, as clearly shown by the waveform EF, the plate voltage remains down during the entire time the timing pulse is present on the line. This is accomplished by reason of the bias on the diode 29 by the timing pulse and the orientation of the diode so that the plate of tube $V_2$ remains at −45 v. for the time $t_1$–$t_2$.

In summing up the operation of the ring during the period $t_0$–$t_2$, it will be remembered that stage N, which was On in the period $t_0$–$t_1$, was turned Off at time $t_1$ by the timing pulse from the ring drive. In the time period $t_1$–$t_2$, stage N was assuming the stable Off condition as shown by the voltage $C_N$, Figure 3. In this same period of time $t_1$–$t_2$, stage 1 has begun to operate to an On condition in that tubes $V_1$ and $V_2$ of this stage have been turned On and Off respectively but the stage has remained Off by reason of the timing pulse which prevents the voltage at the plate of $V_2$ from rising and changing the output voltage.

At time $t_2$, the timing pulse H terminates and the point 30 rises to a voltage of +10 v. This allows the grid of tube $V_3$ to rise to 10 v. which drives $V_3$ to heavy conduction and raises the cathode of $V_3$ to 12 volts. Diode 29 prevents the cathode voltage from rising above 12 volts. In the period $t_2$–$t_3$, the output from stage 1, voltage G, is at a positive potential and the stage is On.

At time $t_3$, a timing pulse appears and drops the potential at point 30 to −45 volts. This drop in potential accomplishes two functions. The first function is to turn stage 1 Off; the second function is to insure that the rise and fall of the output voltage G, Figure 3, is kept within predetermined time limits. In computer applications, ring circuits such as this are usually associated with long lines which have a large amount of capacitance associated therewith. In dropping the voltage on a line with which there is a large amount of capacitance associated there is a time element involved which is dependent upon the resistance through which the capacitance must discharge.

The first function is accomplished by impressing −45 volts on the grid of tube $V_3$. When this happens, the tube $V_3$ does not conduct as heavily as before and the voltage at the cathode of tube $V_3$ drops to −35 v. Diode 27 prevents the voltage output from dropping to any lower value. When the voltage output drops to −35 v., the capacitor 10 of tube $V_1$ is discharged through resistor 11 until the point is reached wherein tube $V_1$ is made non-conducting. This is graphically shown in Figure 3, period $t_3$–$t_4$ voltages B and C.

The second function is accomplished by the diode 29 being in series with the capacitance of the line and the ring drive. When the timing pulse does appear at point 30 at a voltage of −45 v. and the output G is at 12 v., the current flow through resistor 28 will be over 100 ma. (resistor 28 being about 470 ohms). This feature provides for a very sharp output pulse G, Figure 3, which allows the individual stages to be used for heavily loaded output lines.

At time $t_3$, when the timing pulse occurred, the input to stage 2, voltage C, Figure 3 of stage 1, began to work on tube $V_1$ of stage 2 in a manner similar to that described in connection with stage N and stage 1. With stage 2 in an Off condition at time $t_3$, the effect of the timing pulse on this stage will be explained. Stage 2, in its Off condition, has a voltage at the plate of $V_2$ of −45 volts. When the timing pulse −45 v. does appear, there will be no current flow between that stage and the ring drive since the voltages are equal. This feature allows a given ring drive to be used on various ring circuits consisting of different stages since there is no coupling between any stage which is Off and the ring drive. The only other connection is that one between the ring drive and the stage which is going to be turned On. This feature, it will be remembered, provides for keeping the output down on those occasions where tubes $V_1$ and $V_2$ of a stage have been operated. The current drawn by the ring drive on these occasions should not run above 20 ma.

Recapitulating, it is seen that the ring drive is selectively coupled to two stages of the ring circuit when a timing pulse is present. One stage is the stage which is being turned from On to Off and the other stage is the stage which is being turned from Off to On. The ring drive turns the first-mentioned stage Off and aids in the output waveform of this stage while the second-mentioned stage is prevented from being turned On until the timing pulse is no longer present. This provides for a sharp line of demarcation between pulses from individual stages.

The On and Off times of this ring circuit are dependent upon the length of the timing pulses from the ring drive since at the beginning of each timing pulse the On stage is turned Off, while the Off stage, which is to be turned On, is kept Off until the timing pulse terminates.

The length of a timing pulse may vary an appreciable amount without causing failure of this ring. A short pulse in ordinary rings can cause failure in not turning Off the stage which was On If this occurs, there will be no advance pulse and the next stage will not be turned On. If the pulse is too long, the stage which is On will be turned Off but the stage which is to be turned On will not do so since the timing pulse is longer than the advance pulse. In this invention the probability of ring failure has been considerably lessened because of the cooperation between the timing pulses and the ring.

When stage 1 is being turned Off, the point 30, voltage H, drops to −45 v. The connection from point H, through diode 29, resistor 28 and resistor 11 results in a direct discharge path from the capacitor 10 at the grid of tube $V_1$ to the negative potential at point H. This allows the condenser to discharge quickly which brings tube $V_1$ below cutoff to generate the advance pulse, voltage C, to the next stage. As can be graphically seen from voltage B, tube $V_1$ is cut off in the first part of the timing pulse $t_3$–$t_4$. Stage 2 is therefore conditioned for the termination of the timing pulse by the operation of tube $V_1$, stage 2, long before the timing pulse terminates. This would allow the timing pulse to be as short as 1 microsecond.

If the timing pulse is longer than the usual pulse, the tube $V_2$, stage 2, is kept in readiness to operate to an Off position by the plate voltage of tube $V_1$, stage 2, which is stored on condenser 20. In the ordinary course of events, when the voltage $A_1$ (same as voltage C, Figure 3) reaches a constant value and the voltage $B_1$ (not shown) has followed and tube $V_1$, stage 2, is conducting, it is important that the lockup voltage from the cathode of tube $V_3$, stage 2, be available to keep voltage $B_1$ at this value. If the tube $V_3$, stage 2, is not conducting, voltage $B_1$ drops toward cutoff and the voltage $C_1$, not shown, will rise. To prevent too quick a voltage change and thus provide for a situation in which the timing pulse is too long, the condenser 20 is made of such a value that it will have sufficient memory to operate tube $V_2$ and consequently the entire stage when the timing pulse is longer than usual. This allows for a timing pulse as long as 4 microseconds.

Figure 4:
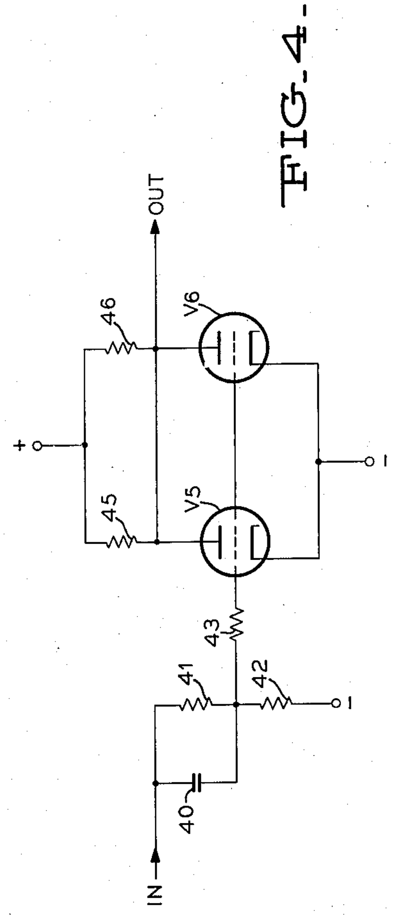
Figure 4 shows a ring drive capable of being used in the circuit of Figures 1, 2*a* and 2*b*.

Figure 4 illustrates a typical ring drive: a source of pulses are applied through a coupling network 40, 41 to a double inverter $V_5$, $V_6$; the output pulses are taken in parallel from the plates of tubes $V_5$ and $V_6$ and used to drive any desired ring circuit.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A ring circuit comprising a plurality of interconnected bistable devices, each said device being operated successively from a first to a second stable state in response to the operation of the preceding device from a second to a first stable state, each said device including a plate driver and cathode follower connected electron discharge tubes connected plate to cathode respectively and to a common output line wherein the plate of said driver is connected to the grid of said cathode follower, a timing pulse source, and means for selectively connecting said pulse source to that device which is in a second stable state whereby said preceding device is switched from a second to a first stable state.

2. The apparatus of claim 1 further including a biasing resistor connected beween the cathode of said cathode follower and said plate to grid connection, said means for selectively connecting said pulse source to said device including a unilateral current conducting device connected to said plate to grid connection and poled to conduct current from said device to said pulse source.

3. The apparatus of claim 2 wherein said device further includes an inverter connected electron discharge tube responsive to said output for controlling said plate driver whereby the tubes of said device will be set to alternate stable states of conduction dependent on the output of any given tube.

References Cited in the file of this patent

UNITED STATES PATENTS

| | | |
|---|---|---|
| 2,404,918 | Overbeck | July 30, 1946 |
| 2,568,914 | Faudell | Sept. 25, 1951 |
| 2,580,771 | Harper | Jan. 1, 1952 |
| 2,596,741 | Tyler et al. | May 13, 1952 |
| 2,601,089 | Burkhart | June 17, 1952 |
| 2,734,684 | Ross et al. | Feb. 14, 1956 |
| 2,764,343 | Diener | Sept. 25, 1956 |
| 2,781,447 | Lester | Feb. 12, 1957 |
| 2,790,076 | Mason | Apr. 23, 1957 |
| 2,848,608 | Nienburg | Aug. 19, 1958 |

OTHER REFERENCES

"Transistor Shift Registers," by Huang, et al., 1954 Convention of the IRE, part IV, pages 140 to 144 (only Fig. 5, page 143).